July 17, 1956 E. P. THIAS 2,755,386

TUNER SHIELD

Filed April 9, 1952 2 Sheets-Sheet 1

INVENTOR.
EDWIN P. THIAS

BY

Ostrolenk + Faber

ATTORNEYS

July 17, 1956 E. P. THIAS 2,755,386

TUNER SHIELD

Filed April 9, 1952 2 Sheets-Sheet 2

INVENTOR.
EDWIN P. THIAS

BY
Ostrolenk & Faber

ATTORNEYS 2,755,386

TUNER SHIELD

Edwin P. Thias, Hollywood, Calif., assignor to Standard Coil Products Co., Inc., Los Angeles, Calif., a corporation of Illinois Application April 9, 1952, Serial No. 281,385

4 Claims. (Cl. 250—40)

This invention relates to radio receiver tuners and more particularly to a television input tuner having an oscillator isolation system.

In a super-heterodyne type of circuit, it is necessary to have a high frequency oscillator which beats the incoming signal with a signal of nearly the same frequency so that the difference or intermediate frequency can be efficiently amplified. However, it is totally undesirable to couple the high frequency oscillator to the antenna. This has been the case in the design of many television receivers heretofore manufactured. Radio frequency energy is coupled from the oscillator coil to the mixer grid coil where it is detected with the television signal to form the I. F. signal. The energy is also fed into the radio frequency stage plate circuit since the oscillator frequency is relatively close to the frequency tuned by that circuit. From the radio frequency plate circuit, it may pass into the antenna circuit by means of the amplifier tube grid-plate capacitance and will be received by other local television sets, thus causing interference.

Additionally, if there is ineffective shielding and ineffective by-passing of power leads, the oscillator energy may be directly radiated from one television receiver to another by means of the voltage supply leads. To minimize this type of interference, the oscillator should be well shielded and the voltage supply leads by-passed so that they can not radiate an interfering signal to other receivers.

Tuners of the type shown in Thias and White Patent No. 2,496,183 dated January 31, 1950, and in my copending application Serial No. 281,386, filed April 9, 1952 when used commercially, assisted in improving television reception to a point where the user was not satisfied with merely receiving a picture but was able to become critical of picture quality. With the present consumer attitude, even minor and previously overlooked defects in the received picture are noted critically and must be overcome.

One source of minor interference in the now established turret type input tuners is the presence of some oscillator radiation of the R. F. amplifier tube grid. This condition can, in certain areas, cause the tuner to operate as a double superheterodyne with frequency conversion of a strong local signal by the first tube producing a signal which interferes with the desired signal. It is of importance, therefore, in order to remove even minor interference patterns from the picture to shield the oscillator from the grid circuit of the R. F. amplifier tube.

In a turret type tuner such as the one disclosed in the above cited Thias and White U. S. patent and in my copending application above cited, the problem of adequate oscillator isolation becomes even more difficult because it is necessary to have the turret, which carries the coils corresponding to individual television channels, in freely rotatable position. The addition of a center divider disc in the turret only partially solves the problem because the box-like chassis is substantially rectangular while the turret is round. The round center divider disc of the turret cannot fill the interior of the chassis since it would interfere with the rotation of the turret.

Instability of the circuits of a television input tuner may result when feed back conditions exist, that is, any stray coupling between the oscillator and converter circuits and the radio frequency amplifier input circuit may result in oscillation or in unwanted regeneration, thus seriously distorting the frequency response curve of the input tuner.

Another factor which complicates the design and manufacture of input tuners is the difficulty of calculating the capacitances which exist between the leads of the circuit and ground due to the proximity of a number of diffrent parts of the chassis at ground potential. If the leads are considerably closer to one part of the chassis, or to a shield at ground potential, random variations may be minimized thus reducing the cost of the manufacture of the input tuner by a reduction in the time required to properly align the tuner.

My invention is directed to a novel solution to this shielding problem by using the existing central transverse circular panel support and indexing plate in the turret as a portion of the shield, and completing the shielding arrangement with a central metallic chassis subdivider, shaped to fit into the chassis around the turret and close up the passages through the interior of chassis left by the circular panel support and indexing plate of the turret, the metallic sub-divider being arranged parallel to the circular panel support and indexing plate and in close juxtaposition thereto. To complete the shielding arrangement, voltage supply leads through the subdivide are passed through feed-through capacitors. The edges of the circular panel support and the subdivider are arranged to overlap.

An object of the present invention, therefore, is to provide means to confine the oscillator energy to one part of a turret type television tuner and prevent radiation thereto by the antenna and voltage supply leads.

Another object is to isolate the oscillator section from the radio frequency section of a television input tuner in order to prevent stray coupling between the circuits and consequent amplification of any undesired signals present in the radio amplifier circuit.

A further object of the present invention is to minimize random variations of capacitance between leads and components in a television input tuner.

A still further object is to increase the stability of the R. F. amplifier and oscillator mixer circuits of a television input tuner by reducing the possibility of undesired feed-back.

A still further object is to reduce the time required to align television input tuners manufactured by mass production methods.

Other objects, features and advantages will appear in the subsequent detailed description which is accompanied by a drawing, wherein.

Figures 1, 2:
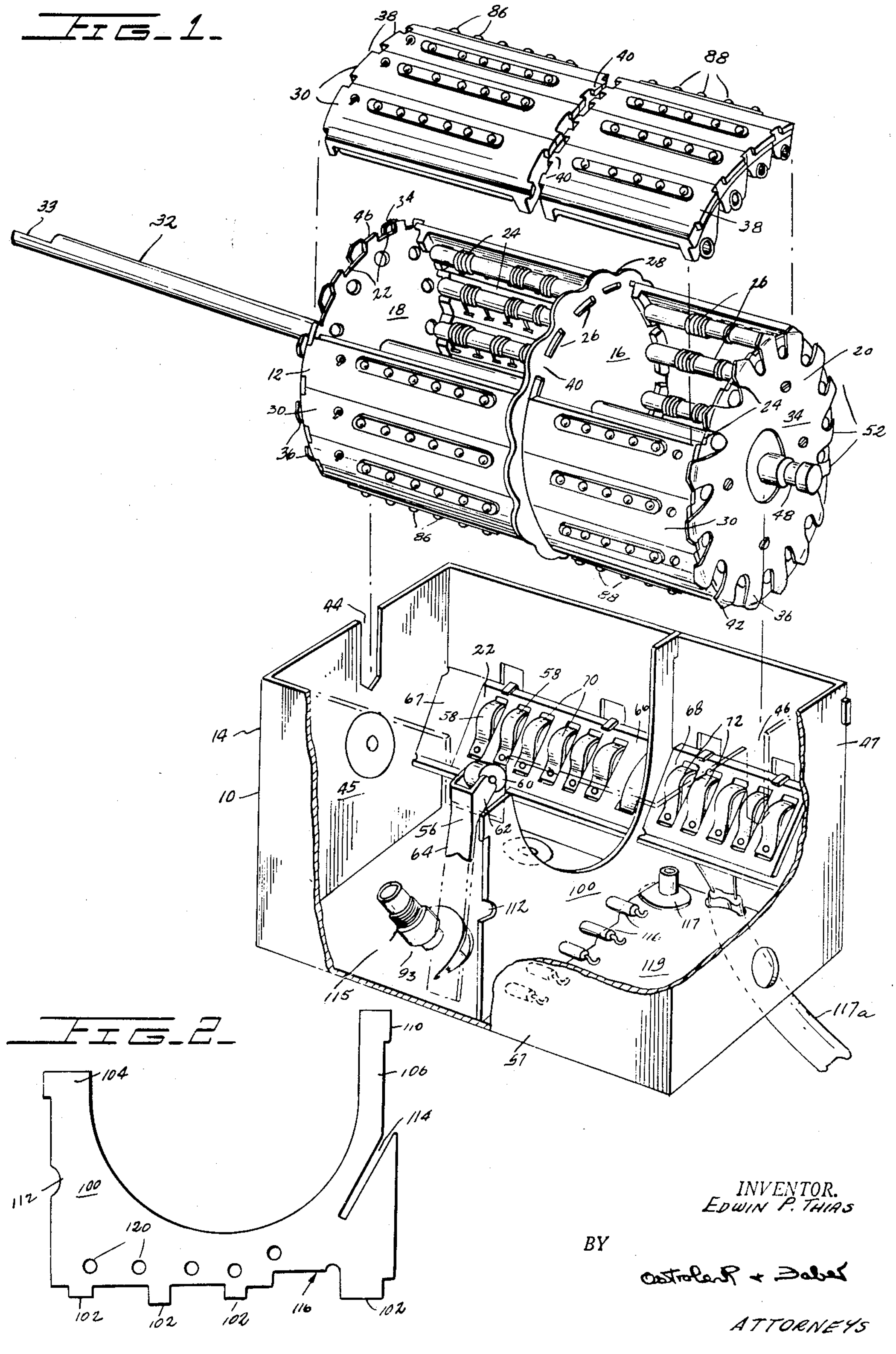
Figure 1 is an exploded view, partly broken away and partly in cross section, of a television input tuner of the turret type embodying the invention, inverted in order to more correctly show the construction thereof.
Figure 2 illustrates the exact shape of a center divider shield of a television input tuner included in the invention.

Referring to Figure 1 showing an exploded view of the input tuner 10 embodying my invention, it will be seen that my novel tuner is an improved modification of the tuner described in the Thias and White Patent No. 2,496,183, dated January 31, 1950, and in the copending application of Gossard Ser. No. 251,763, filed October 17, 1951, now abandoned, and assigned to the present assignee.

The input tuner 10 comprises a turret and a chassis 14, tubes 15 and 17, a fine tuner 19 and other associated elements to be described more fully below.

The drum 12 carried by the chassis 14 consists essentially of three supporting discs rigidly fixed in the shaft 32, the discs comprising a center divider positioning disc 16, a front disc or end wall 18 and a rear disc or end wall 20.

Disc 18 and disc 20 are provided with slots 22 and 24, respectively, the number of slots 22 and the number of slots 24 being equal to the number of sets of tuning panels used, in this case twelve. The slots serve as described in the above patent to position the panels. Disc 16, of larger diameter than discs 18 and 20, is provided with slots 26. Disc 16 has indentations or notches 28 located at its outer circumference and extending beyond the surface produced by the structure of panels generally referred to as panels 30. The three discs, 16, 18 and 20, secured to a rotatable shaft 32, may be rotated by an actuating knob (not shown) mounted on the flat end 33 of the said shaft 32.

The outer discs 18 and 20 are provided with spring members 34 each having a plurality of integral resilient fingers 36, the number of these resilient fingers being equal to the number of sets of panels, in this example twelve.

Panels 30 are supported and positioned on discs 16, 18 and 20 by slots 22 and 24 of discs 18 and 20 respectively, so that the larger extensions 38 of the panels 30 engage slots 22 and 24, and small spaced extensions 40 at the other end of panels 30 engage slots 26 of the disc 16, thus, completing the outer periphery of the drum 12.

Spring fingers 36, which have a bent portion 42 in close resilient contact with the extensions 38, therefore maintains the panels 30 fixed to the discs 18 and 20. It is evident, on the other hand, that when panels 30 are to be removed from drum 12, it is only necessary to bend fingers 36 so that the panels 30 may be removed in a direction perpendicular to shaft 32 and pulled out of their position in turret 12, as shown.

Chassis 14, which is rectangular in shape, is provided with recesses 44 and 46 in the front and rear walls 45 and 47 respectively, the recesses 44 and 46 having V-shaped ends through which shafts 32 of drum 12 is mounted on chassis 14. The V-shaped recess 44 is not of the same dimension as the recess 46, recess 46 being of smaller dimension than recess 44. The recess 46 is engaged by the smaller diameter portion 48 of the shaft 32 while V-shaped recess 40 is engaged by a regular portion of shaft 32.

Figures 3, 4, 5:
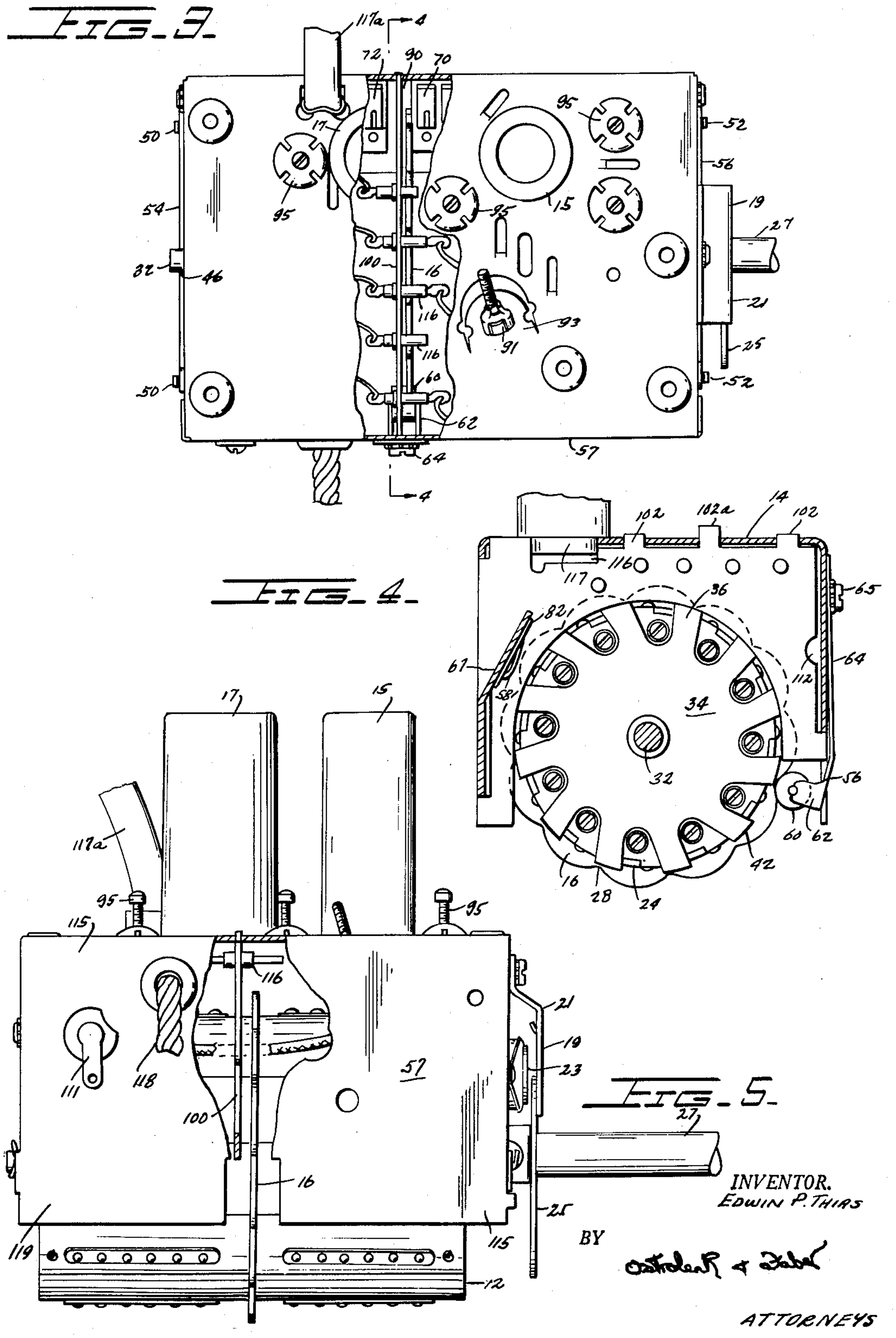
Figure 3 illustrates a top elevational view of the television input tuner of Figure 1, partly broken away and partly in section showing the bypass capacitor construction embodied in the invention.
Figure 4 is a cross sectional view along lines 4—4 of Figure 3 embodying the invention.
Figure 5 is a side elevational view of the television input tuner of Figure 1 partly broken away and partly in cross section embodying the invention.

On chassis 14 (see Figure 3) adjacent the recess 44 and on each side thereof is provided a first pair of bent fingers 50; a second pair of bent fingers 52 is provided on each side of recess 46. The fingers 50, 52 are kicked out of the material of each chassis wall containing the recess 44 or 46. The wire spring 54 can now hold the shaft 32 of turret 12 in place on chassis 14 at wall thereof in co-operation with the bent fingers 52 by biasing shaft 32 against the two sides of the V-shape of the recess 46, thus making impossible any transverse movement of shaft 22 and turret 12 at this end of the tuner. Similarly, at the remaining end opposite wall of the chassis spring 56 held by fingers 52 maintains the front end of the shaft 32 in fixed position.

The fine tuner 19 (see Figure 5) comprises the ground plate 21 mounted on the chassis and a metal faced ceramic button 23 mounted in an aperture in the chassis. The two plates form a capacitor which is varied by the dielectric plate 25 perpendicularly fixed to the outer shaft 22. The fine tuner 19 is more fully described in my copending application.

The indexing device 56 consists of a spring biased cam roller 60 at one side of turret 12, the roller 60 being pivoted on the U-shaped extension 62 of a detent spring 64 secured by means of a screw 65 to chassis 14.

Roller 60 resiliently and releasably engages the indentations 28 of the divider disc 16, thus positioning them with turret 12 and its panels 30 at any of the selected angular positions with respect to chassis 14, and more particularly with respect to the stationary contact structure 58.

Aligning notches 28 in disc 16 have a V-shape and it is against the side of this V that roller 60 is pressed by the spring 64; in other words, roller 60 is maintained by spring 64 against notch 28 so that the disc 16 and therefore drum 12 will be firmly positioned by means of the roller 60 in co-operation with V-shaped notch 28 to provide the detent action for a particular television channel in that position. The other side of the chassis carried the stationary contact structure 58.

Stationary contact structure 58 consists of two insulating supports 66 and 68 mounted on the bent portion 67 of chassis 14. Support 66 is provided with six kidney spring contacts 70 which are riveted to the insulating support 66. The six kidney springs 70, in turn, each has an extension 82 providing a means for effecting a soldered connection (see Figure 4).

Insulating support 68 is provided with five kidney spring contacts 72 and is also riveted to the insulating support 68. Spring contacts 72 each, in turn, are connected in any appropriate manner to terminals of the circuits mounted on the chassis 14. The stationary contacts 72 engage contacts 88 on the pair of panels 30 on turret 12 and are selected by angular rotation of turret 12.

Spring contacts 70 engage contacts 86 mounted on the panels 30 and are associated with the oscillator-converter elements of the tuner. Spring contacts 72 engage the contacts 88 which are associated with the antenna and radio frequency amplifier input circuit of the tuner.

The ground contact spring 90 mounted on the bent portion 67 of chassis 14 between the insulator support members 66 and 68 makes resilient contact with the center divider disc 16, electrically grounding said disc 16.

The I. F. transformer 91 is angularly mounted on tab 93 and a plurality of trimmer condensers 95 are mounted on the top of chassis 14 (see Figure 3).

Summarizing the turret and switching construction of the television input tuner, it will be seen that the center divider disc 16, which is grounded electrically, separate the coils on the turret corresponding to the antenna-radio frequency amplifier input circuit, and the oscillator converter coils.

This construction tends to reduce undesired feed back and oscillator radiation via the antenna and voltage supply leads. However, the oscillator energy may be impressed on the antenna and voltage supply leads owing to the fact that the drum itself does not completely fill the chassis; this is because the chassis 14 is substantially angular or rectangular while the turret 12 is, of course, round. The round center divider disc 16 used on the turret 12 cannot fill the full interior of the chassis 14 since it would interfere with the rotation of the drum.

A novel center shield 100 having a plurality of bypass capacitors passing therethrough, operating in conjunction with the divider disc 16, solves the problem.

The center shield 100 is located at approximately the position of the center divider disc 16 on the drum 12 with the paralleled adjacent edges of shield 100 overlapping the edges of disc 16. The center divider shield 100 is provided with a plurality of tabs 102 at its upper edge which are received in appropriately positioned slots in the top wall of the chassis, the center divider 100 then being soldered in position by solder engaging the top chassis and the tabs 102 which extend therethrough.

One of the tabs 102*a* is longer than the other tabs 102 and is utilized by a twisting of the tab 102*a* after being inserted into the slot (not shown), to maintain the position of the center shield 100 until the soldering is completed.

The center divider 100 is positioned alongside the divider disc 16 close enough to it and overlapping its edges so that it will complete the shielding effect created by the disc 16 itself. The center shield 100 has a notch 112 on the leg 106 which is utilized to provide a through space for certain leads to pass from one portion of the tuner to the other.

A slot 114 positioned on the leg 106 is appropriately placed in such a manner that the bent portion 67 will fit therebetween, thus, further rigidly positioning the shield 100. The notch 116 fits over a portion of the radio frequency amplifier tube socket 117, thus completing the shielding of that particular portion of the circuit and serving to isolate the input section of the tube from the output section.

The center divider shield 100 has two legs 104 and 106, the outside edges of which are in near surface to surface contact on the inside sides of the chassis 14. The leg 104 is shorter in order to provide appropriate clearance for the cam roller 60. Tabs 108 and 110 are received in their appropriate positioned slots (not shown) on the side wall of the chassis and are also soldered in place, thereby rigidly fixing the position of the center shield 100 with respect to the chassis 14.

The center divider shield 100 has a plurality of feed through capacitors 116 mounted therein. These capacitors may have a capacity of the order of eight hundred micromicrofarads in order to provide proper feed-through for the various leads and connections which must be passed through the center divider shield 100. This bypasses all radio frequency energy to ground.

The plate and cathode tube terminals of the oscillator section are on the side of the shield remote from the antenna lead-in and prevent coupling within the tuner.

In a particular case when a lead must pass through without the utilization of a feed-through or by-pass capacitor of any kind, for example, the output lead 111 from the converter to the I. F. amplifiers, the notch 112 is provided for the lead for that particular operation.

It will be seen from an inspection of the Figure 1 that the oscillator section 115 is isolated by the center drum disc 16 and the center shield divider 100 from the antenna lead 117 and the voltage supply leads 118 of the radio frequency amplifier input section 119 (see Figure 5) thereby creating a complete tuner wherein excessive local oscillator radiation through the antenna and the voltage supply leads is obviated.

This isolation of the oscillator radio frequency section of the television input tuner also prevents stray coupling between circuits and consequent amplification of any undesired signals present in the radio amplifier circuits. The construction also reduces undesirable feed-back conditions which would result in oscillation or regeneration effects, thus distorting the frequency response curves of the television input tuner.

By the use of this construction, with the center shield 100 placed in close proximity to many other leads, random variations of capacitance to ground of these leads are materially reduced. Since these random variations in capacitance to ground are reduced, the manufacturing design of the input tuner is simplified and the time required to align this type of television input tuner when produced by mass production methods is thereby reduced.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a television input tuner, a substantially box-like chassis having a top wall, and side walls, a rotatable tuning turret having a plurality of coils associated with a radio frequency amplifier input section and a plurality of coils associated with an oscillator section; said turret being mounted on a shaft, a center divider metallic shield on said turret between the radio frequency input section coils and the oscillator section coils; a plurality of contacts on said turret comprising contacts individual to each coil; a plurality of stationary contacts; said turret being angularly movable to interengage successively selected sets of contacts for the radio frequency input coils and the oscillator coils with said stationary contacts; voltage supply and antenna leads carried by said chassis and connected thereto at the portion of the chassis in which the radio frequency input coils of the turret are fixed; an additional fixed shield secured between the top and side walls of the chassis; said additional shield extending parallel to the center divider disk and adjacent thereto; the edge of the fixed shield remote from the top wall being curved to fit around said turret, said fixed shield and said divider disk cooperating to shield said radio frequency input section and antenna from said oscillator section and to shield said turret mounted radio frequency coils from said turret mounted oscillator coils.

2. In a television input tuner, a substantially box-like chassis having a top wall, and side walls, a rotatable tuning turret having a plurality of coils associated with a radio frequency amplifier input section and a plurality of coils associated with an oscillator section; said turret being mounted on a shaft, a center divider metallic shield on said turret between the radio frequency input section coils and the oscillator section coils; a plurality of contacts on said turret comprising contacts individual to each coil; a plurality of stationary contacts; said turret being angularly movable to interengage successively selected sets of contacts for the radio frequency input coils and the oscillator coils with said stationary contacts; voltage supply and antenna leads carried by said chassis and connected thereto at the portion of the chassis in which the radio frequency input coils of the turret are fixed; an additional fixed shield secured between the top and side walls of the chassis; said additional shield extending parallel to the center divider disk and adjacent thereto; the edge of the fixed shield remote from the top wall being curved to fit around said turret; the edge of the fixed shield and the edge of the center divider disk overlapping; said fixed shield and said divider disk cooperating to shield said radio frequency input section and antenna from said oscillator section and to shield said turret mounted radio frequency coils from said turret mounted oscillator coils.

3. In a television input tuner, a substantially box-like chassis having a top wall, and side walls, a rotatable tuning turret having a plurality of coils associated with a radio frequency amplifier input section and a plurality of coils associated with an oscillator section; said turret being mounted on a shaft, a center divider metallic shield on said turret between the radio frequency input section coils and the oscillator section coils; a plurality of contacts on said turret comprising contacts individual to each coil; a plurality of stationary contacts; said turret being angularly movable to interengage successively selected sets of contacts for the radio frequency input coils and the oscillator coils with said stationary contacts; voltage supply and antenna leads carried by said chassis and connected thereto at the portion of the chassis in which the radio frequency input coils of the turret are fixed; an additional fixed shield secured between the top and side walls of the chassis; said additional shield extending parallel to the center divider disk and adjacent thereto;

the edge of the fixed shield remote from the top wall being curved to fit around said turret; the edge of the fixed shield and the edge of the center divider disk overlapping; said fixed shield and said divider disk cooperating to shield said radio frequency input section and antenna from said oscillator section and to shield said turret mounted radio frequency coils from said turret mounted oscillator coils; said stationary contacts being carried by said chassis on a fixed panel mounted in said chassis; said fixed shield having a recess closely fitting and receiving said panel.

4. In a television input tuner, a substantially box-like chassis having a top wall, and side walls, a rotatable tuning turret having a plurality of coils associated with a radio frequency amplifier input section and a plurality of coils associated with an oscillator section; said turret being mounted on a shaft, a center divider metallic shield on said turret between the radio frequency input section coils and the oscillator section coils; a plurality of contacts on said turret comprising contacts individual to each coil; a plurality of stationary contacts; said turret being angularly movable to interengage successively selected sets of contacts for the radio frequency input coils and the oscillator coils with said stationary contacts; voltage supply and antenna leads carried by said chassis and connected thereto at the portion of the chassis in which the radio frequency input coils of the turret are fixed; an additional fixed shield secured between the top and side walls of the chassis; the securement of fixed shield being by tabs extending through chassis walls and attached thereto; said additional shield extending parallel to the center divider disc and adjacent thereto; the edge of the fixed shield remote from the top wall being curved to fit around said turret; the edge of the fixed shield and the edge of the center divider disc overlapping; said fixed shield and said divider disc cooperating to shield said radio frequency input section and antenna from said oscillator section and to shield said turret mounted radio frequency coils from said turret mounted oscillator coils.

References Cited in the file of this patent

UNITED STATES PATENTS

| | | |
|---|---|---|
| 1,382,914 | Hoxie | June 28, 1921 |
| 1,897,337 | Schofield | Feb. 14, 1933 |
| 2,078,909 | Gunther | Apr. 27, 1937 |
| 2,296,678 | Linder | Sept. 22, 1942 |
| 2,341,345 | Billiard | Feb. 8, 1944 |
| 2,496,183 | Thias et al. | Jan. 31, 1950 |
| 2,512,138 | Butt | June 20, 1950 |
| 2,551,228 | Achenbach | May 1, 1951 |
| 2,611,807 | Lazzery | Sept. 23, 1952 |